United States Patent [19]
Gast

[11] Patent Number: 5,836,546
[45] Date of Patent: Nov. 17, 1998

[54] AUTOPILOT/FLIGHT DIRECTOR UNDERSPEED PROTECTION SYSTEM

[75] Inventor: Mark E. Gast, Seabrook, Tex.

[73] Assignee: The Boeing Company, Seattle, Wash.

[21] Appl. No.: 782,507

[22] Filed: Jan. 10, 1997

Related U.S. Application Data

[62] Division of Ser. No. 441,468, May 15, 1995.

[51] Int. Cl.⁶ .......................... B64C 13/16; B64C 13/08; G05D 01/00; G05D 01/08
[52] U.S. Cl. .................. 244/76 B; 244/178; 244/182; 244/195; 364/424.016
[58] Field of Search ................... 244/76 B, 178, 244/181, 182, 185, 188, 199, 195; 364/424.016

[56] References Cited

U.S. PATENT DOCUMENTS

| | | | |
|---|---|---|---|
| 3,399,850 | 9/1968 | Kramer et al. | 244/77 |
| 3,624,364 | 11/1971 | Dommasch | 235/150.2 |
| 3,627,236 | 12/1971 | Hess | 244/77 D |
| 3,691,356 | 9/1972 | Miller | 235/150.22 |
| 3,981,144 | 9/1976 | Smith | 235/150.2 |
| 3,998,411 | 12/1976 | Blechen | 244/188 |
| 4,027,839 | 6/1977 | Quinlivan | 244/195 |
| 4,044,975 | 8/1977 | Blechen et al. | 244/181 |
| 4,471,439 | 9/1984 | Robbins et al. | 364/433 |
| 4,569,021 | 2/1986 | Larson et al. | 364/431.01 |
| 4,646,243 | 2/1987 | Graupp et al. | 364/439 |
| 4,764,872 | 8/1988 | Miller | 364/433 |
| 4,967,363 | 10/1990 | Bonafe | 364/427 |
| 5,079,711 | 1/1992 | Lambregts et al. | 364/434 |
| 5,096,146 | 3/1992 | Orgun et al. | 244/179 |
| 5,375,793 | 12/1994 | Rivron et al. | 244/75 R |
| 5,386,954 | 2/1995 | Bissey et al. | 244/181 |
| 5,408,413 | 4/1995 | Gonser et al. | 364/446 |
| 5,478,031 | 12/1995 | Piche | 244/195 |

*Primary Examiner*—Virna Lissi Mojica
*Attorney, Agent, or Firm*—Seed and Berry LLP

[57] ABSTRACT

An underspeed protection system for an aircraft under autopilot control selects a target speed based upon the greater of a minimum maneuver speed and a stick shaker speed. The system then compares a monitored speed to the target speed to produce an error signal. The system also monitors vertical speed to determine if tie aircraft begins to descend. If the error signal due to the underspeed condition causes the aircraft to descend, the system provides a hold zero vertical speed signal in place of the error signal such that the aircraft seeks to maintain its altitude. The hold zero vertical speed signal overrides the underspeed error signal such that the aircraft does not pitch forward to seek an increased speed.

17 Claims, 4 Drawing Sheets

AUTOPILOT/FLIGHT DIRECTOR UNDERSPEED PROTECTION SYSTEM

CROSS-REFERENCE TO RELATED APPLICATION

This application is a divisional of U.S. patent application Ser. No. 08/441,468, filed May 15, 1996, now pending.

TECHNICAL FIELD

The present invention relates to aircraft flight control systems, and more particularly, to an underspeed protection system for autopilots and flight directors.

BACKGROUND OF THE INVENTION

Aircraft flight control systems allow a pilot to control the orientation of an aircraft in three axes, namely, yaw, pitch, and roll. The pitch axis extends along the wingspan of the aircraft, the roll axis extends along the length of the aircraft, and the yaw axis is perpendicular to both the pitch axis and the roll axis. The orientation of the aircraft about the yaw axis is controlled by foot pedals which deflect the aircraft's rudder from side-to-side. The orientation of the aircraft about the pitch axis is generally controlled by pushing or pulling on the control yoke to deflect the aircraft's elevator down or tip, respectively. Finally, the orientation of the aircraft about the roll axis is generally controlled by rotating the control wheel in either direction to differentially deflect ailerons on the aircraft's wing.

In addition to being manipulated by the pilot, an aircraft's flight controls can also be controlled automatically by autopilots and yaw dampers. Autopilots manipulate the aircraft's ailerons to control the direction of flight in order to follow a heading or course set by the pilot. Autopilots also manipulate the aircraft's elevator to control the altitude of the aircraft in a "altitude hold" mode, or to control the rate of climb or descent of the aircraft in a vertical speed (vertical feet/second) or vertical profile or navigation (vertical feet/mile). Yaw dampers manipulate the rudder to limit yawing of the aircraft in turbulence. The above-described autopilot modes are usually combined so that the autopilot is controlling simultaneously both the ailerons and the elevator. The autopilot may also combine modes for the same axis, such as when the "altitude capture" mode is selected. In the altitude capture mode, the autopilot operates in the vertical speed or vertical navigation mode to control the rate of descent or climb until a preset altitude is reached. The autopilot then automatically switches to the altitude hold mode to maintain the aircraft at the preset altitude.

Although aircraft flight controls can be controlled either manually or automatically, there is also a semi-automatic mode of operation using a flight director. A flight director receives command signal from the autopilot that would be used to control the aircraft flight controls. However, instead of actually controlling the flight controls, the command signals control the position of a flight director bar oil the pilot's attitude indicator to tell the pilot how to manipulate the flight controls so that the airplane flies according to the preset flight profile. Thus, for example, the flight director tells the pilot to lower or raise the nose of the aircraft by pushing or pulling on the yoke so that the aircraft achieves a preset rate of climb or is maintained at a preset altitude. Similarly, the flight director tells the pilot to bank the airplane by rotating the control wheel so that the aircraft is timed to a desired heading.

For a given flight condition, the airspeed may be highly dependent upon several flight parameters, including the amount of thrust delivered by the engines. However, the autopilot typically does not control the thrust. Instead, the applied thrust is selected by the pilot. For this reason, the autopilot, or the pilot following the flight director's commands, may inadvertently place the airplane in an unsafe speed condition when the autopilot or the flight director is set to a new mode or the aircraft's flight conditions change. For example, the autopilot may be switched from an altitude hold mode in which the aircraft is maintained in level flight to a vertical speed mode in which the aircraft is climbing. The thrust needed to climb at a given airspeed is significantly greater than the thrust needed to fly in level flight at that same airspeed. Thus, if the thrust remains constant, the aircraft will fly at a lower airspeed after the autopilot or flight director is switched to the vertical speed mode from the altitude hold mode. In some cases, the decreased airspeed may approach, or even become less than, a recommended minimum maneuver airspeed of the aircraft. If the pilot does not increase the thrust or take some other action, such as changing the selected flight condition or mode, the aircraft could decelerate well below the recommended minimum maneuver airspeed.

To address this concern, aircraft have employed airspeed monitors coupled to warning systems to provide a warning to the pilot that the aircraft has reached the recommended minimum maneuver speed. Such aircraft relied upon the pilot to take some positive action, such as increasing the thrust, to increase the airspeed above the recommended minimum maneuver speed.

SUMMARY OF THE INVENTION

An underspeed protection system and method overrides pilot selected autopilot commands in the event that the autopilot commands result in an aircraft underspeed condition. The underspeed protection system selects a nominal minimum maneuver speed for the aircraft as the recommended minimum airspeed. The nominal minimum maneuver speed is then compared to a monitored actual speed of the aircraft by comparing a first electrical signal corresponding to the minimum maneuver speed to a second electrical signal corresponding to the actual speed. If the actual speed of the aircraft is below the minimum maneuver speed, a first underspeed signal is supplied to an electronic flight controller. In response to the first underspeed signal, the underspeed protection system overrides the selected set of flight control parameters by supplying a revised set of flight control parameters to seek a revised flight condition in which the actual airspeed of the aircraft approaches the nominal minimum maneuver airspeed. The revised flight control parameters are maintained until either the pilot disengages the autopilot or the pilot selects a new set of flight control parameters.

To accommodate the inputs of conventional autopilots, the first underspeed signal is filtered and a second, unfiltered, underspeed signal is produced to complement the first underspeed signal. Both signals are supplied to the autopilot.

To prevent a rapid descent of the aircraft, the vertical speed is monitored and, if the vertical speed indicates that the aircraft must descend to reach the minimum maneuver speed, a hold zero vertical speed command is produced. The hold zero command is input to the autopilot and prevents the aircraft from pitching forward. The aircraft will then seek to maintain level flight and not permit the aircraft to descend.

In the preferred embodiment, the nominal minimum maneuver airspeed is selected from the greater a calculated minimum maneuver airspeed from the flight management system minus fifteen knots and a conventionally determined stick shaker speed plus seven knots.

To improve the rapidity of the response in flight path angle mode, the filtered, first underspeed signal is augmented by a forcing signal derived from the flight path acceleration.

DETAILED DESCRIPTION OF THE INVENTION

Figure 1:
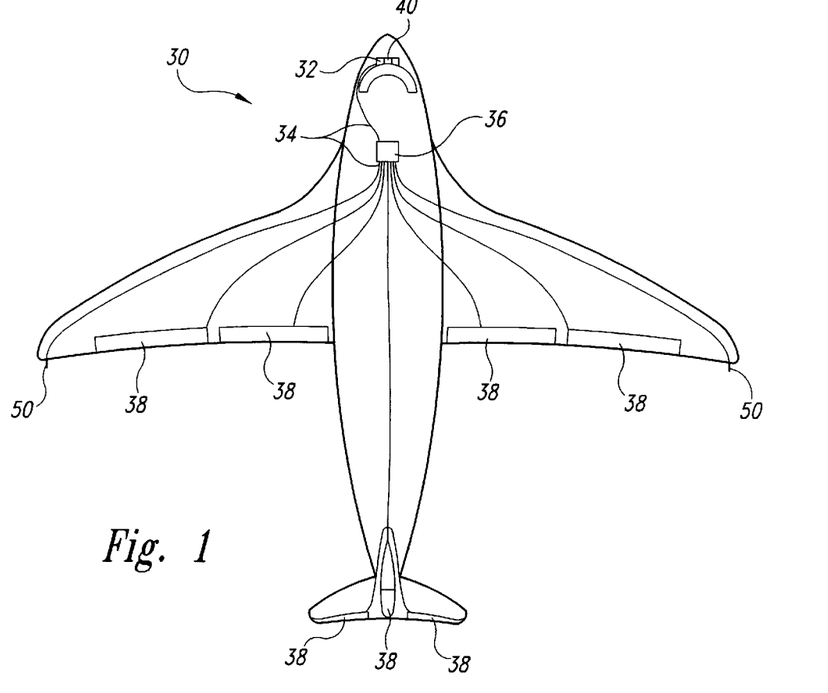
FIG. 1 is a plan view of a representative aircraft including an underspeed protection system, autopilot/flight director, and flight control system.

As shown in FIG. 1, an aircraft 30 operates under control of either the pilot or an autopilot 32. The autopilot is coupled through a control bus 34 to the flight control systems 36 of the aircraft 30 which operate the flight control surfaces 38 such as flaps, ailerons, elevators, and rudder. In the preferred embodiment, the autopilot is one of three autopilots (the master autopilot and two slave autopilots) operating cooperatively with each other. The autopilot 32 also includes a flight director interface for providing flight director commands to the pilot. Each of the autopilots 32 includes an underspeed protection system 40, as will be described below. As discussed below with respect to FIG. 4, each of the three autopilots 32 and its respective underspeed protection system 40 operates identically, and only one will be described herein.

Figure 2:
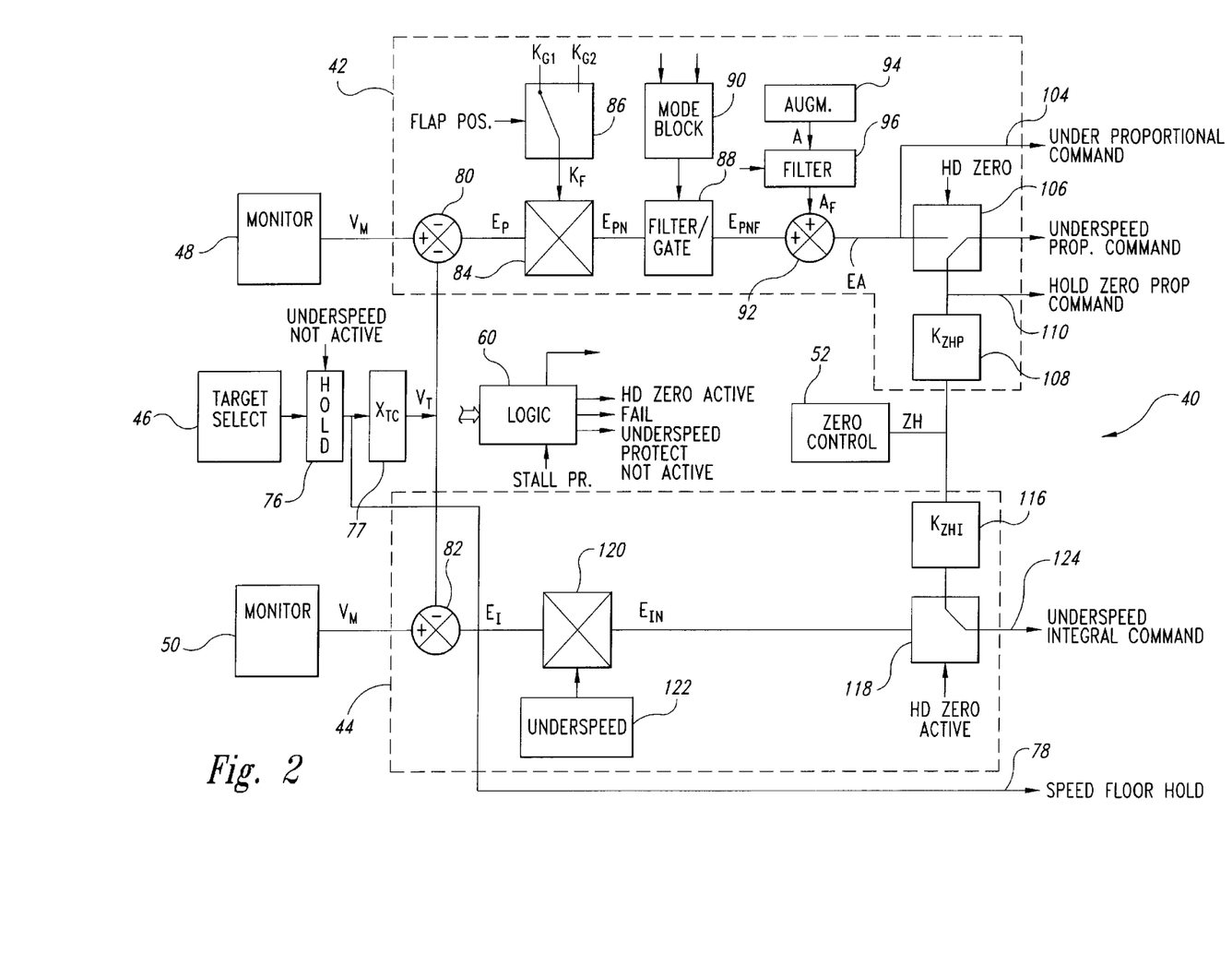
FIG. 2 is a simplified block diagram of the underspeed controller of FIG. 1

The underspeed protection system 40, shown in greater detail in FIG. 2, includes an underspeed proportional signal generator 42 in parallel with an under speed integral signal generator 44, each driven by a target speed selector 46 and a respective airspeed monitor 48 or 50. The signal generators 42, 44 also receive signals from a zero control circuit 52 which provides a signal indicative of a hold zero vertical speed condition for the aircraft 30, as will be described hereinafter with respect to FIGS. 4 and 5. The underspeed proportional signal generator 42 produces an underspeed proportional command that is input to a proportional command input of the autopilot 32. Similarly, the underspeed integral signal generator 44 produces an underspeed integral command that is input to an integral command input of the autopilot 32. The autopilot 32 accepts the integral and proportional commands and controls the flight systems in response through the control bus 34.

As will be described hereinafter, the underspeed proportional command and the underspeed integral command are weighted en or signals corresponding to the differences between a monitored airspeed $V_M$ and a target airspeed $V_T$. Based on the underspeed proportional and integral commands, the autopilot 32 adjusts the flight control systems, preferably the elevator, to alter the flight profile to minimize the difference between the monitored air speed $V_M$ and the target airspeed $V_T$ and thereby reduce the magnitude of the error signals. The target airspeed $V_T$, which is selected by the target speed selector 46, as described hereinafter with respect to FIG. 3, is dependent upon the greater of a stick-shaker speed $V_{SS}$, of the aircraft 30, as provided by the warning electronic system of the aircraft, and a minimum maneuver speed of the aircraft 30 as provided by the flight management system or the warning electronic system of the aircraft.

Figure 3:
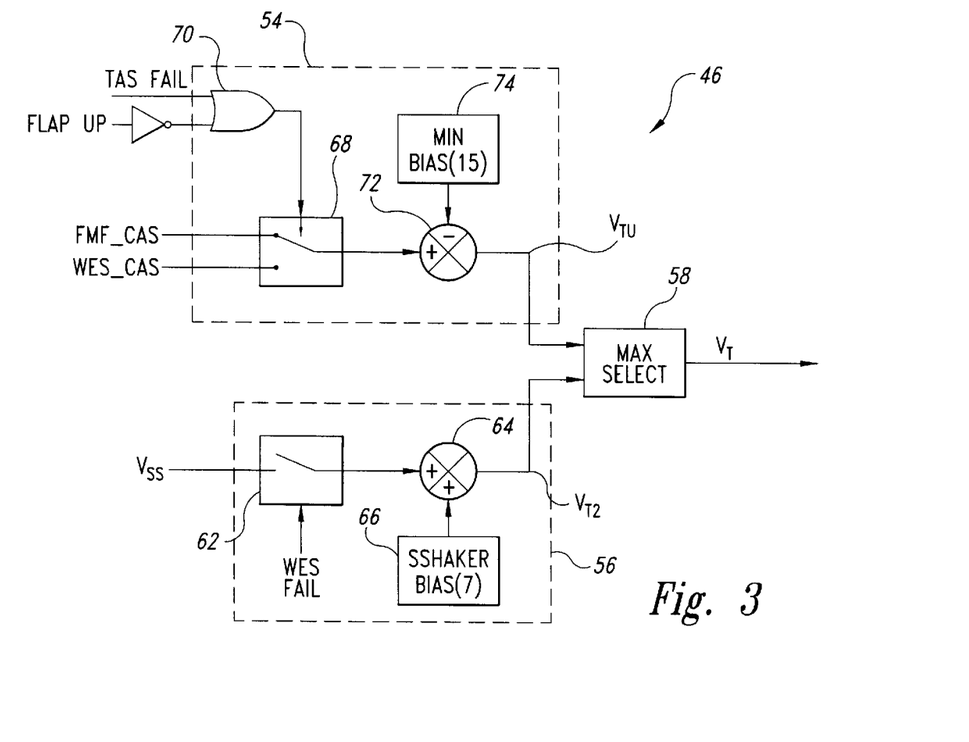
FIG. 3 is a block diagram of the target select circuit of the block diagram of FIG. 2.

The target speed selector 46, shown in greater detail in FIG. 3, selects the target speed $V_T$ and includes two arms 54, 56 coupled to a maximum select circuit 58. The upper arm 54 and the lower anon 56 produce respective voltages $V_{TU}$ and $V_{TL}$, each corresponding to a minimum target airspeed that is input to the maximum select circuit 58. It will be understood by one of skill in the art that, unless the context indicates otherwise, airspeeds and other flight conditions (e.g., flap position and impact pressure) can be represented by either digital words when the underspeed protection system is implemented by digital computer system or by corresponding electrical signals when the underspeed protection system is implemented in whole or in part by analog system. For clarity of presentation, the electrical signals will be referred to herein by their physical respondents.

The underspeed protection system 40 also includes a logic circuit 60 that generates various command signals, such as an Underspeed Protection Not Active Command and a Hold Zero Command, based on operating modes selected by the pilot and signals received from the autopilot 32. The logic circuit 60 will be described in detail below with respect to FIG. 5.

With further reference to FIG. 3, the maximum select circuit 58 selects the greater of the two minimum airspeeds $V_{TU}$ and $V_{TL}$ as the target airspeed $V_T$. To produce the minimum airspeed $V_{TL}$ $V_{TU}$, the lower arm 56 utilizes the stick-shaker speed $V_{SS}$ from the aircraft's warning electronic system as its principal input signal. Within the lower arm 56, the stick-shaker speed $V_{SS}$ is gated by a switch 62 activated by a WESF signal from the warning electronic system that indicates whether or not the warning electronic system is in fail mode. If the warning electronic system is not in fail mode, the switch 62 passes the stick-shaker speed $V_{SS}$ to an adder 64 where a bias block 66 increases the stick-shaker speed $V_{SS}$ by 7 knots to produce the minimum airspeed $V_{TL}$.

The upper arm 54 utilizes one of two calibrated airspeeds FMF_CAS or WES_CAS as its principal input signal. The calibrated airspeed FMF_CAS is a minimum maneuver speed supplied by the flight management system of the aircraft 30 and the calibrated airspeed WES_CAS is a minimum maneuver speed provided by the warning electronic system of the aircraft. The selection between the calibrated airspeeds FMF_CAS and WES_CAS is made by a switch 68 in response to an output of an OR gate 70. The OR gate 70 produces a "1" if either the flight management system has determined a failure with minimum true airspeed from the flight management system, or if the flaps are down as indicated by an inverse of a FLAP_UP signal at an input 71.

The output of the OR gate 70 thus provides a control signal to a control input of the switch 68, such that the switch 68 passes the signal WES_CAS if either the flaps are down or the flight management system has identified a failure with minimum true airspeed from the flight management system. Otherwise, the switch 68 passes the signal FMF_CAS. In either case, the output of the switch 68 is provided to an adder 72. There, a minimum bias block 74 coupled to a negative input of the adder 72 provides a minimum bias of 15 knots, such that the minimum airspeed $V_{TU}$ for the upper arm 54 is equal to the output of the switch 68 (FMF_CAS or WES_CAS) minus 15 knots.

The maximum select circuit 58 therefore receives at its two inputs the minimum airspeed $V_{TU}$ from the upper arm 54 and the minimum airspeed $V_{TL}$ from the lower arm 56. The maximum select circuit 58 selects the greater of the airspeeds $V_{TU}$, $V_{TL}$ as the target airspeed $V_T$.

Returning to FIG. 2, the target airspeed $V_T$ from the target select circuit 46 is input to a hold circuit 76 that also receives at a control input an Underspeed Protect Not Active command. The hold circuit 76 continuously outputs the target airspeed $V_T$ selected by the maximum select circuit 58 until the Underspeed Protect Not Active Command goes low indicating that the underspeed protect is active. At that point, the hold circuit 76 maintains value of the target airspeed $V_T$ at a constant level. The held target airspeed $V_T$ is output directly by the underspeed protection system 40 as a speed floor hold output 78. The target airspeed $V_T$ from the hold circuit 76 is also input to multiplier 77 where the target airspeed $V_T$ is normalized by multiplication by a variable $X_{TC}$ to produce a normalized target airspeed $V_{TN}$. The variable $X_{TC}$ is developed by comparing the true airspeed to the calibrated airspeed such that the normalization at the multiplier 77 provides the normalized target airspeed $V_{TN}$ as a true airspeed rather than a calibrated airspeed.

The normalized target airspeed $V_{TN}$ from the multiplier 77 is input to adders 80, 82 within the underspeed proportional signal generator 42 and the underspeed integral signal generator 44, respectively.

In the underspeed proportional signal generator 42, the adder 80 also receives the monitored airspeed $V_M$ as determined by the airspeed monitor 48 and subtracts the target airspeed $V_{TN}$ to produce an error signal $E_P$. The error signal $E_P$ is normalized at a multiplier 84 by a constant $K_F$ from a dual constant block 86 to produce a normalized error signal $E_{PN}$.

The dual constant block 86 is a switch that receives two underspeed constants $K_{G1}$ and $K_{G2}$ which are empirically derived constants. The switch within the dual constant block 86 is controlled by a flap position signal such that the constant $K_{G1}$ is selected as the input constant $K_F$ for flap angles less than or equal to 1° and the constant $K_{G2}$ is selected for flap angles greater than 1°. The normalized error signal $E_{PN}$ from the multiplier 84 is then filtered at a filter/gate 88 having a reset input connected to a mode block 90 driven by a pair of mode inputs indicating whether or not the flight path angle mode or vertical speed modes are engaged. If neither of the flight path angle mode or the vertical speed mode is engaged, the mode block 90 produces a reset signal for the filter/gate 88 such that the filter/gate 88 passes the normalized proportional error signal $E_{PN}$ unchanged. If the mode block 90 determines that the flight path angle or vertical speed modes is engaged, the filter/gate will low pass filter the normalized proportional error signal $E_{PN}$. The post-filter normalized proportional error signal $E_{PNF}$ is next augmented at an adder 92 by a filtered augmentation signal $A_F$ from a serially connected augmentation circuit 94 and filter 96.

Figure 4:
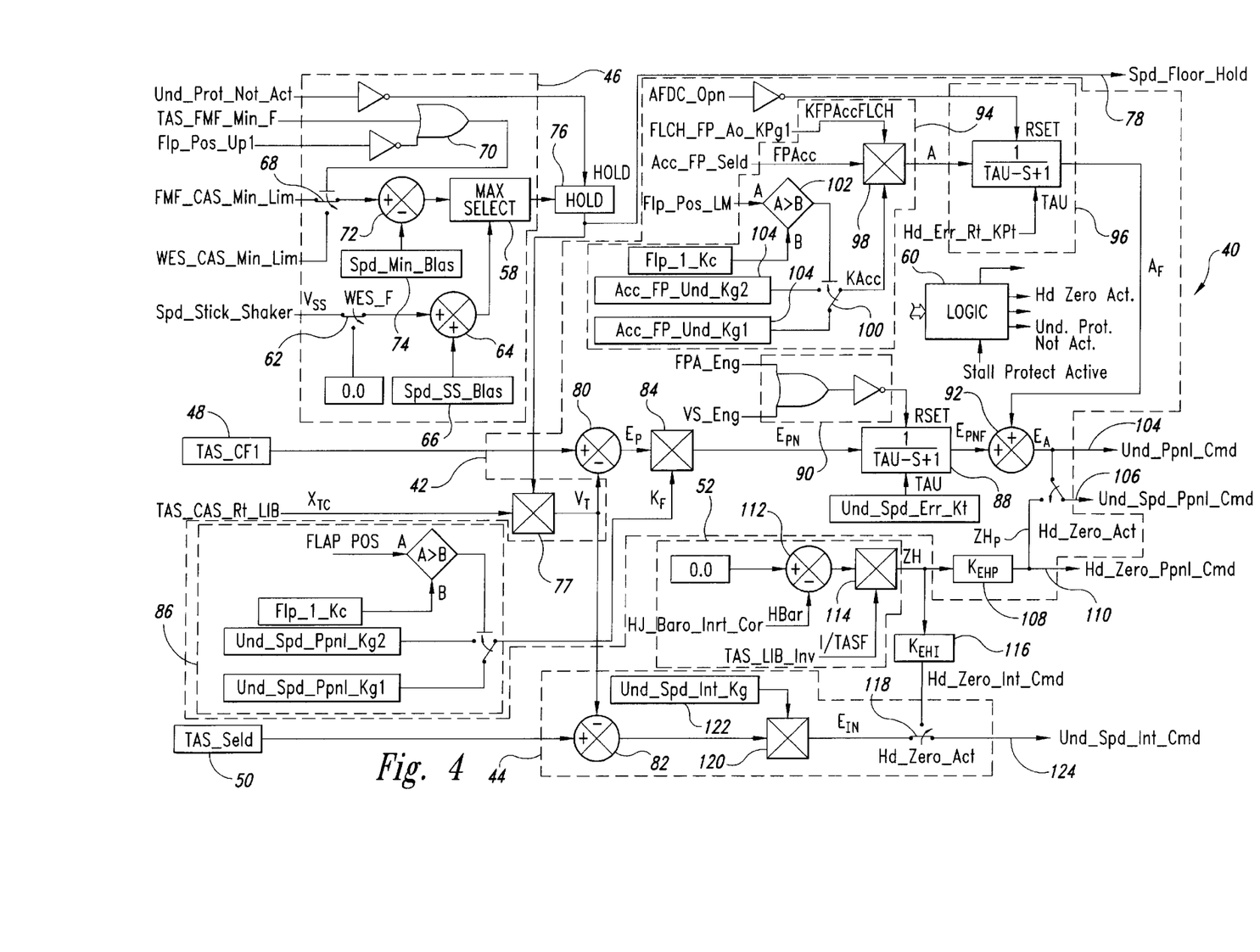
FIG. 4 is a detail block diagram of the underspeed controller of FIG. 2.

The augmentation circuit 94 and filter 96 are shown in greater detail in FIG. 4. The augmentation circuit 94 includes as its central element a multiplier 98 receiving two variables KFPAccFLCH and FPAcc and one constant KAcc. The variables KFPAccFLCH and FPAcc are variables produced by the air data inertial reference unit in response to impact pressure and a calculated flight path acceleration.

The constant KAcc is one of two flight path acceleration constants KAcc1 and KAcc2. A switch 100 acting under control of a flap position detector 102 selects as the constant KAcc one of the constants KAcc1 or KAcc2 from respective constant blocks 104 depending upon whether the detected flap position is greater than or less than 1°. At the multiplier 98, the variables KFPAccFLCH and FPAcc are multiplied by each other and by the constant KAcc to produce the augmentation signal A. The augmentation signal A is then filtered by the filter 96 if the autopilot flight director computer is operating to produce the filtered augmentation signal $A_F$.

The filtered augmentation signal $A_F$ and the filtered normalized proportional error signal $E_{PNF}$ are added at the adder 92 to produce the output signal $E_A$ which forms the under proportional command and is output from the proportional signal generator 42 at an output 104. In addition to forming an output of the underspeed proportional signal generator 42, the under proportional command is also input to a select switch 106 having as its output the underspeed proportional command. The select switch 106 is controlled by a Hold Zero Active Command from the logic circuit 60 such that the augmented error signal $E_A$ forms the underspeed proportional command when the Hold Zero Active Command is low.

When high, the Hold Zero Active Command causes the underspeed induced error signals to be replaced by a set of hold zero error signals as will be described below. In the hold zero vertical speed condition, the aircraft 30 will seek to maintain its altitude, rather than pitch forward in an effort to gain speed. This prevents the aircraft 30 from descending rapidly in response to an underspeed condition. If the airspeed is insufficient to maintain the altitude, the aircraft will still seek to maintain the hold zero vertical speed condition.

The hold zero vertical speed proportional signal is provided at the remaining input of the select switch 106 as a normalized zero proportional command $ZH_P$. The normalized zero proportional command $ZH_P$ comes from the zero control circuit 52 as a zero hold signal ZH that is normalized at a gain block 108 where it is multiplied by a zero hold constant $K_{ZHP}$ to produce the normalized zero proportional command $ZH_P$. The normalized zero proportional command $ZH_P$ from the gain block 108, in addition to being input to the select switch 106 is output from the underspeed protection system 40 as a hold zero vertical speed proportional command at a hold zero output 110.

The zero hold signal ZH is produced by the hold zero control 52 in response to a monitored altitude rate HBar and an inverse of filtered monitored airspeed 1/TASF. The altitude rate HBar is subtracted from a zero bias at an adder 112 within the zero hold circuit 52 to produce a negative of the altitude rate HBar. The negative of the altitude rate HBar is then input to a multiplier 114. At the multiplier 114, the negative of the altitude rate HBar is multiplied by the inverse of a filtered true airspeed 1/TASF to produce the zero hold signal ZH that produces the normalized zero proportional command ZHpat the output of the gain block 108.

As can be seen from the above discussion, the select switch 106 selects from the under proportional command and the hold zero proportional command to produce the underspeed propositional command.

Development of the underspeed integral command will now be described with reference to FIGS. 2 and 4. The underspeed integral signal generator 44 receives the monitored airspeed from the monitor 50 and the normalized target airspeed $V_{TN}$ from the multiplier 77. At an adder 82 within the underspeed integral signal generator 44, the normalized target airspeed $V_{TN}$ is subtracted front the monitored airspeed $V_M$ to produce an integral error signal $E_I$. The integral error signal $E_I$ is normalized at a multiplier 120 where it is multiplied by an underspeed constant from a constant block 122 to produce a normalized error $E_{IN}$. The normalized error signal $E_{IN}$ is then input to a select switch 118 having as its second input a zero integral command $ZH_I$ that is a normalized version of the hold zero, signal ZH from a gain block 116. The select switch 118 also receives as a control command the Hold Zero Active Command from the logic circuit 60. The output of the select switch 118 is equal to either the normalized error signal $E_{IN}$ when the Hold Zero Active Command is low or the zero integral command $ZH_I$ when the Hold Zero Command is high. Whichever of the normalized error signal $E_{IN}$ or the zero integral command $ZH_I$ is selected by the select switch 118 becomes the underspeed integral command and is provided at an output 124 of the underspeed protection system 40 from which it can be transmitted to the integral input of the autopilot 32 and to the logic circuit 60.

As discussed above, the underspeed protection system 40 responds to a number of command signals, including the Hold Zero Active Command and the Underspeed Protect Not Active Command, generated by the logic circuit 60. The development of commands by the logic circuit 60 will now be described with reference to FIG. 5. The logic circuit 60 consists principally of an active mode section 126, a hold zero vertical speed detector 128, a minimum speed detector 130, a fail section 132 and a pitch limiter section 134. The output of the pitch limiter section 134 and an output of the active mode section 126 are combined at an OR gate 136 to produce the Underspeed Protect Not Active Command at an output 138 such that if either the pitch limiter section 134 or the active mode section 126 Outputs a "1", the Underspeed Protect Not Active Command will be high.

Figure 5:
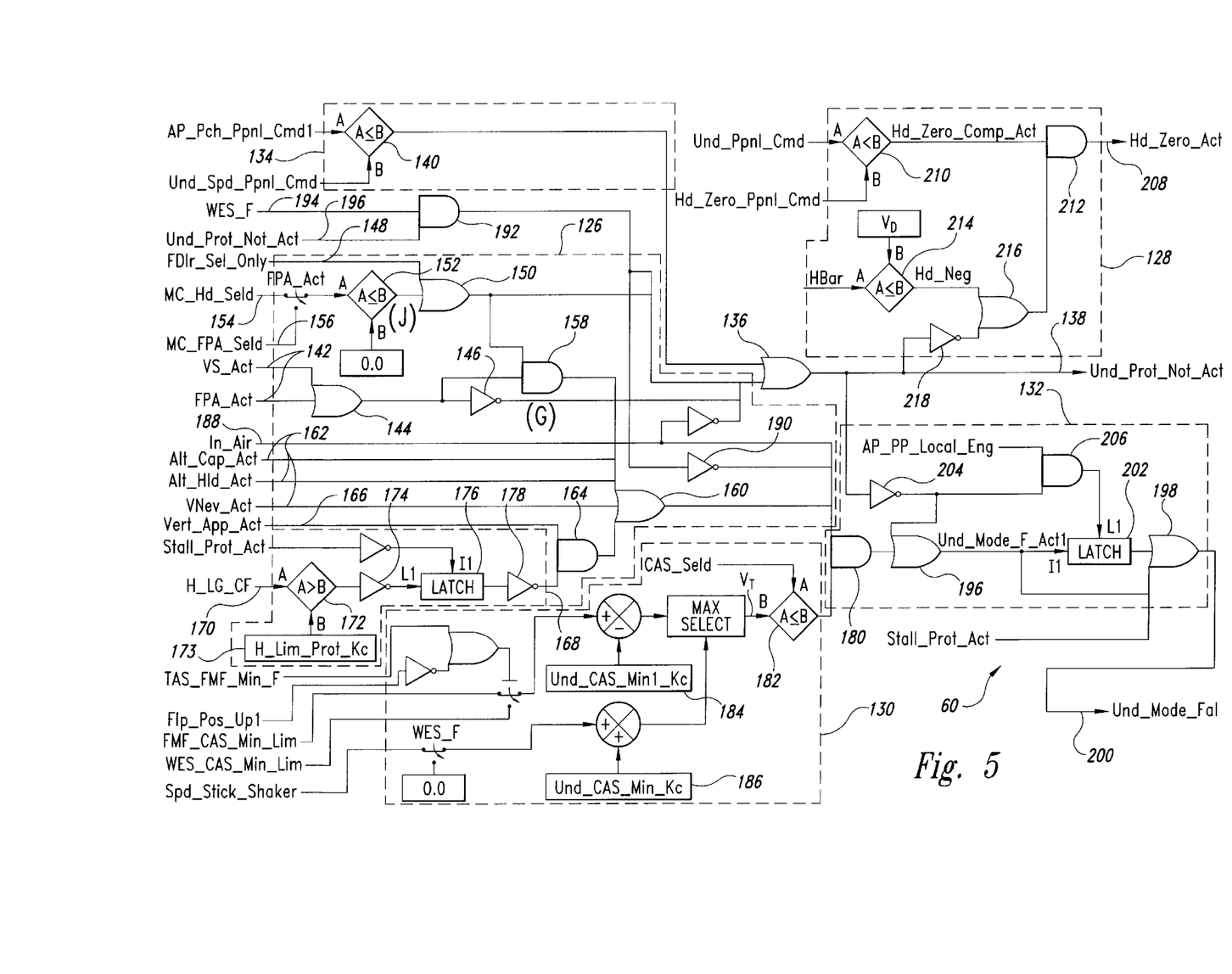
FIG. 5 is a detail logic diagram of a logic controller within the underspeed controller of FIG. 2.

The pitch limiter 134 receives an autopilot pitch proportional command from the autopilot 32 and the underspeed proportional command from the switch 106 (FIG. 4) and performs a comparison at a comparator 140. The comparator 140, and thus the pitch limiter section 134, outputs a "1" if the autopilot proportional pitch command is less than or equal to the underspeed proportional command.

The active mode section 126 produces a "1" for input to the OR gate 136 when one of several conditions is satisfied. The first condition is established by an OR gate 144. If the vertical speed mode and the flight path angle mode are both not active, a "0" will be provided to each of the inputs 142 of the OR gate 144 such that the OR gate 144 produces a "0". The output of the OR gate 144 is then coupled through all inverter 146 to the OR gate 136 such that the Underspeed Protect Not Active Command will be a "1" whenever neither of vertical speed mode or flight path active mode are selected.

Alternatively, if the flight director only mode is selected, a "1" will be provided at an input 148 of an OR gate 150 which has its output connected to the OR gate 136. Consequently, when flight director only mode is selected, the Underspeed Protect Not Active command will be a "1".

The remaining input of the OR gate 150 may also establish the underspeed Protect Not Active Command as a "1". The remaining input of the OR gate 150 is coupled to an output from a comparator 152 that receives a vertical speed signal or a flight path angle signal from the aircraft's mode control panel, depending upon whether or not the flight path angle mode is active, respectively. If either of the vertical speed signal at all input 154 or the flight path angle signal at an input 156 is less than zero, the comparator 152 outputs a "1" and the Underspeed Protect Not Active command will be a "1". If either of the conditions (flight path angle negative and flight path angle mode active or vertical speed negative) is met, the OR gate 150 outputs a "1" to the OR gate 136 setting the Underspeed Protect Not Active command to a "1".

The output of the OR gate 150 also forms one input to an AND gate 158. A second input of the AND gate 158 is connected to the output of the OR gate 144 described above. The output of the AND gate 158 forms one input to a mode active OR gate 160. Each of three additional inputs 162 to the mode active OR gate 160 is connected to receive a "1" if one group of selected modes is active. In a preferred embodiment, the selected modes are the altitude capture, altitude hold and vertical navigation modes. If any one of these modes is selected, the output of the mode active OR gate 160 is a "1".

A fifth input to the mode active OR gate 160 comes from an AND gate 164 that receives as one of its inputs 166 a "1" if the vertical approach mode is active. The remaining input of the AND gate 164 is coupled to an output of a landing protect section 168. The landing protect section 168 receives at one input 170 an altitude signal and compares that altitude signal at a comparator 172 to a minimum altitude of 200 feet from a minimum limit block 173. The output of the comparator 172 is inverted at an inverter 174 and input to a latch input L1 of a latch 176. Consequently, the latch 176 receives a "1" only if the altitude is less than the minimum altitude of 200 feet.

A control input 11 of the latch 176 receives a control signal that is the inverse of a Stall Protect Active Command. The Stall Protect Active Command is a signal that, if high, indicates that the aircraft 30 is approaching a stall condition. The Stall Protect Active Command is preferably obtained by comparing monitored angle of attack $\alpha_M$ to a target angle of attack $\alpha_T$ determined from the aircraft's stick shaker angle of attack $\alpha_{SS}$. While the Stall Protect Active Command in the preferred embodiment is produced in a stall protection system that is described in detail in co-pending U.S. application Ser. No. 08/441,683 which is incorporated herein by reference, the Stall Protect Active Command may be produced in any acceptable manner that indicates the aircraft 30 is approaching a stall condition.

If the Stall Protect Active Command is active and the output of the inverter 174 is a "1", the latch will output a "1" to an output inventor 178 which will, in turn, output a "0" to the AND gate 164. Thus, the AND gate 164 will receive a "1" from the inverter 178 only if the aircraft is above 200 feet. Even if these conditions were satisfied, the AND gate 164 will only output a "1" in vertical approach mode as dictated at the input 166. From the above discussion, it can be seen that the mode active OR gate 160 outputs a "1" if one of the selected modes is active, the vertical approach mode selected/aircraft altitude greater than 200 feet/stall protect not active conditions are met, or if the vertical speed and flight path angle modes are active and the conditions for the OR gate 150 are satisfied.

The output from the mode active OR gate 160 is input to the fail section 132 at an input AND gate 180 where it is combined in a logical AND with an output from the minimum speed detector 130. The minimum speed detector 130 is identical in structure to the target selector 46, except that the minimum speed detector 130 includes a comparator 182 at its output and that the constants from bias blocks 184, 186 in the minimum speed detector 130 may differ from the constants provided by the bias block 66 and the minimum bias block 74 in the target selector 46. Because the remaining elements are identical, the description of the selection of a target airspeed $V_{TM}$ will not be repeated here. After the target airspeed $V_{TM}$ is selected, it is compared at the comparator 182 with a measured calibrated airspeed $V_C$ and, if the measured calibrated airspeed $V_C$ is less than the target airspeed $V_{TM}$, the comparator 182 outputs a "1." The output of the comparator 182 thus provides a "1" when the measured calibrated airspeed $V_C$ falls below the target airspeed $V_{TM}$.

Two additional conditions are also imposed by the input AND gate 180. First, an in air signal at an input 188 must be high to indicate that the aircraft 30 is in the air. The second condition comes from an inverter 190 that provides the inverse of the output from a warning system AND gate 192. The warning system AND gate 192 provides a "1" and thus disables the input AND gate 180 when the warning electronic system is in fail mode as indicated at an input 194 and the Underspeed Protect Not Active Command is high at an input 196.

If the mode active OR gate 160 provides a "1," the minimum speed detector 130 provides a "1", and the additional conditions (in air, warning electronic system not fail), then the input AND gate 180 outputs a "1." The "1" from the AND gate 180 is passed through an OR gate 196 to an output OR gate 198 and an Underspeed Mode Fail command is issued at an output 200 of the logic circuit 60. The Underspeed Mode Failure Command will also issue if the Stall Protect Active Command is high because the Stall Protect Active Command is also input to the output OR gate 198.

In addition to issuing an Underspeed Mode Fail command if the conditions imposed by the input AND gate 180 are met or if the Stall Protect Active Command is high, the fail section 132 may also issue all Underspeed Mode Fail command from a latch 202. The latch 202 receives the output of the OR gate 196 as its initializing input, either when the input AND gate 180 outputs a "1" or when the Underspeed Protect Not Active command from the OR gate 136 is high (i.e., underspeed protect goes active) due to an inverter 204 coupling the OR gate 136 to the OR gate 196. The output of the inverter 204 also forms one input to a local autopilot AND gate 206 that has its output connected to the latch input of the latch 202. The remaining input of the local autopilot AND gate 206 receives a signal indicating whether or not the local autopilot is engaged. If the local autopilot is not engaged, the local autopilot AND gate 206 outputs a "0" and the latch 202 is disabled. If, however, the local autopilot is engaged and the Underspeed Protect Not Active command is low, the local autopilot AND gate 206 will output a "1" and the latch 202 will be enabled. Note that when these conditions are satisfied, the input I1 to the latch 202 from the OR gate 196, will also be a "1" and the latch 202 will output a "1". Consequently, the latch 202 will output "1" when the local autopilot is engaged and the underspeed protect mode is entered.

In addition to issuing the Underspeed Mode Fail command and the Underspeed Protect Not Active command, the logic circuit 60 also outputs the Hold Zero Active command from an output 208 of the hold zero detector 128. The hold zero vertical speed detector 128 issues the Hold Zero Active Command in response to three input signals. The first two signals are the under proportional command from the output 104 (FIG. 4) and the hold zero vertical speed proportional command from the output 110 (FIG. 4). These signals are compared at a comparator 210 which outputs a "1" if the under proportional command is less than the hold zero vertical speed proportional command. The output of the comparator 210 is then input to a hold zero AND gate 212.

The remaining signal input of the hold zero vertical speed detector 128 receives the altitude rate HBar and compares it to a maximum descent rate $V_D$ (preferably zero descent) at a comparator 214. The comparator 214 outputs a "1" to an OR gate 216 if the aircraft 30 is descending more rapidly than the maximum descent rate $V_D$. The OR gate 216 then passes the "1" from the comparator 214 to the hold zero AND gate 212, and, if the hold zero AND gate 212 receives a "1" from the comparator 210, it produces a "1" setting the Hold Zero Active Command high. From the above discussion it can be seen that the Hold Zero Active command goes high when the hold zero vertical speed proportional command exceeds the under proportional command and the comparator 214 determines that the aircraft 30 is descending.

Because of the inclusion of an inverter 218 between the output of the OR gate 136 and the input of the OR gate 216, the hold zero AND gate 212 may also output a "1" as the Hold Zero Active command if the Underspeed Protect Not Active signal is a "0," so long as the hold zero vertical speed proportional command exceeds the underspeed proportional command, as determined at the comparator 210.

While various embodiments have been described in this application for illustrative purposes, the claims are not limited to the embodiments described herein. Equivalent devices or steps may be substituted for those described, and operate according to the principles of the present invention and fall within the scope of the claims.

I claim:

1. An apparatus for producing an underspeed override signal in an aircraft having an autopilot, comprising:
   a flight speed monitor configured to monitor a flight speed of the aircraft and to produce an electrical signal corresponding to the monitored flight speed;
   a first minimum maneuver speed selector producing an electrical signal corresponding to a first minimum maneuver speed;
   a second minimum maneuver speed selector producing an electrical signal corresponding to a second minimum maneuver speed;
   a target speed signal generator coupled to receive the electrical signal corresponding to the first minimum maneuver speed and the electrical signal corresponding to the second minimum maneuver speed, the target speed signal generator producing a target signal, the target signal corresponding to the greater of the first minimum maneuver speed and second minimum maneuver speed; and
   an error signal generator having a first input coupled to receive the electrical signal from the flight speed monitor and a second input coupled to receive the target signal from the target speed signal generator, the error signal generator producing the override signal corresponding to the difference between the target speed and the monitored flight speed in response to the target signal and the electrical signal from the flight speed monitor, the error signal generator having an output coupled to provide the override signal to the autopilot.

2. The apparatus of claim 1 wherein the target speed signal generator includes:
   a maximum select circuit coupled to receive the electrical signals corresponding to the first and second minimum maneuver speeds, the maximum select circuit producing an initial target signal in response to the electrical signal corresponding to the greater of the first and second minimum maneuver speeds;

a latch circuit having an unlatch input, the latch circuit coupled to receive the initial target signal and operative output the initial target signal in response to an unlatch signal at the unlatch input and to output a constant signal in response to a latch signal at the unlatch input to maintain the target signal.

3. The apparatus of claim 2, further including:

a vertical speed monitor;

a hold zero circuit coupled to the vertical speed monitor, the hold zero circuit being operative to produce a hold zero signal in response to a vertical speed less than a selected minimum vertical speed; and a switching circuit having a first input, a second input, a control input, and a switch output, the first input being coupled to the hold zero circuit, the second input being coupled to the error signal generator, the control input being coupled to the error signal generator and the output being coupled to the autopilot, the switching circuit being responsive to a control signal at the control to couple one or the other of the first and second inputs to the switch output.

4. The apparatus of claim 3, further including a logic control circuit having a first output coupled to the hold zero circuit and a second output coupled to the unlatch input.

5. The apparatus of claim 1, wherein the hold zero speed selector includes an altitude change detector producing the electrical signal corresponding to the hold zero vertical speed.

6. An underspeed control system for an aircraft having a plurality of flaps, comprising:

a first zero hold circuit operative to produce a first hold zero signal corresponding to a selected flight condition;

a target airspeed signal generator producing a target signal corresponding to a target airspeed;

a first underspeed signal generator, the first underspeed signal generator including:

a first airspeed monitor producing a first signal corresponding to a first monitored airspeed; and a first comparing circuit coupled to the target airspeed signal generator to receive the signal target and coupled to the first airspeed monitor to receive the first signal, the first comparing circuit being responsive to produce a first error signal indicating a difference between the target airspeed and the first monitored airspeed;

a first selection switch having a first input coupled to receive the first error signal, a second input coupled to receive the first hold zero signal, a first switching input, and a first switch output wherein the selection switch is responsive to a first switching signal at the first switching input to selectively couple the first or second input to the first switch output;

a logic control circuit having a first logic input coupled to the selection switch output and a flap signal output, the logic circuit providing a flap signal at the flap signal output in response to a signal from the first switch output; and a plurality of flap controllers coupled to respective ones of the flaps, the controllers having control inputs coupled to the logic control circuit and responsive to control the position of the respective flaps in response to the flap signal from the flap signal output.

7. The underspeed control system of claim 6, further comprising:

a vertical speed detector; and a selection circuit coupled to the vertical speed detector and operative to produce the first switching signal in response to a vertical speed below a selected minimum.

8. The underspeed control system of claim 6, further comprising:

a second underspeed signal generator, including:

a second airspeed monitor producing a second signal corresponding to a second monitored airspeed; and a second comparing circuit coupled to the target airspeed signal generator and the second airspeed monitor, the second comparing circuit producing a second error signal indicating a difference between the target airspeed and the second monitored airspeed; and a second selection switch having a first input coupled to receive the second error signal, a second input coupled to receive the second hold zero signal, a second switching input, and a second switch output wherein the selection switch is responsive to a second switching signal at the control input to selectively couple the first or second input to the second switch output;

wherein the logic control circuit further includes a second logic input coupled to the second switch output, the logic circuit being responsive to a signal from the second switch output to provide the flap signal.

9. The underspeed control system of claim 8 wherein the first comparing circuit includes:

a difference circuit having a first difference input coupled to the target airspeed signal generator and a second difference input coupled to the first airspeed monitor, the difference circuit further including a difference output providing a difference signal corresponding to a difference between the first signal corresponding to the first monitored speed and the signal corresponding to the target airspeed; and a normalizing circuit having a signal input coupled to receive the difference signal, a first variable input, and a normalized signal output, the normalizing circuit producing the error signal at the normalizing output in response to the difference signal at the signal input and a first variable signal at the first variable input.

10. The underspeed control system of claim 9, further comprising:

a flap position detector coupled to one of the flaps and having a flap output coupled to the variable input, the flap position detector being configured to produce the variable signal in response to the detected flap position.

11. An aircraft, comprising:

a plurality of flaps;

a plurality of flap controllers coupled to the flaps and configured for control by electrical flap control signals; and an underspeed control system having a plurality of flap control outputs coupled to the flaps, the underspeed control system including:

an airspeed monitor configured to monitor an airspeed of the aircraft and to produce a monitored airspeed signal;

a minimum speed circuit providing a signal corresponding to a minimum airspeed of the aircraft;

a comparing circuit coupled to the airspeed monitor and the minimum airspeed circuit, the comparing circuit including a difference output and providing a difference signal indicative of the difference between the monitored airspeed and the minimum airspeed;

an output circuit having a first input coupled to the comparing circuit and an output coupled to the flap controllers; and a hold zero circuit configured to Produce a selected hold zero flap control signal wherein the output circuit includes a second input coupled to the hold zero circuits the output circuit being configured to couple one of the difference signal and the hold zero signal to the output circuit, such that one of the difference signal and the hold zero signal forms the hold zero flat control signal.

12. The aircraft of claim 11 further comprising:

a flap position detector, wherein the output circuit includes a variable gain circuit coupled to the flap position detector, the variable gain circuit being responsive to adjust the difference signal in response to the detected flap position.

13. An underspeed control apparatus, comprising:

an airspeed monitor operative to monitor an airspeed of an aircraft and to produce an airspeed signal in response thereto;

a vertical speed monitor operative to monitor a vertical speed of the aircraft;

a target airspeed generator operative to produce a signal indicative of a minimum airspeed, said target and speed generator comprising first and second target speed generators for producing first and second target speeds;

a comparing circuit coupled to the airspeed monitor and the target airspeed generator, the comparing circuit providing an error signal in response to the monitored airspeed falling below the minimum airspeed; and an electronic aircraft controller coupled to receive the error signal, the controller including a control circuit configured to adjust operational parameters of the aircraft in response to the error signal, the electronic controller including an override circuit coupled to the vertical speed monitor, the override circuit being operative to override the control circuit in response to the vertical speed falling below a selected minimum vertical speed.

14. The underspeed control apparatus of claim 13 wherein the selected minimum vertical airspeed is negative.

15. The underspeed control apparatus of claim 13 wherein the selected minimum vertical speed is zero.

16. An underspeed control circuit for an aircraft having flaps, comprising:

an airspeed monitor configured to monitor an airspeed of the aircraft;

a target speed generator configured to produce a target airspeed;

an electronic comparator coupled to the airspeed monitor and the target speed generator, the comparator producing an error signal corresponding to the difference between the monitored and target airspeeds;

a flap detect circuit coupled to the flaps and configured to detect a flap position;

a boost circuit coupled to the comparator and the flap detect circuit, the boost circuit being configured to boost the error signal in response to the detected flap position to produce a boosted error signal; and a flap controller coupled to the boost circuit and responsive to the boosted error signal to adjust the position of the flaps.

17. The underspeed control apparatus of claim 16 wherein the target airspeed generator includes:

first and second target speed generators for producing first and second target speeds; and a maximum select circuit operative to select the greater of the first and second target speeds as the target airspeed.

* * * * *